US012606090B2

(12) United States Patent
Bair et al.

(10) Patent No.: US 12,606,090 B2
(45) Date of Patent: Apr. 21, 2026

(54) BRACKET ASSEMBLY WITH BENDABLE SUBSTRATE

(71) Applicant: ILLINOIS TOOL WORKS INC., Glenview, IL (US)

(72) Inventors: Scott D. Bair, Skokie, IL (US); John F. Healey, Naperville, IL (US); Piotr Sliwa, Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 145 days.

(21) Appl. No.: 18/527,103

(22) Filed: Dec. 1, 2023

(65) Prior Publication Data

US 2024/0181966 A1     Jun. 6, 2024

Related U.S. Application Data

(60) Provisional application No. 63/430,094, filed on Dec. 5, 2022.

(51) Int. Cl.
B60R 1/24          (2022.01)
B60S 1/02          (2006.01)

(52) U.S. Cl.
CPC ................ B60R 1/24 (2022.01); B60S 1/026 (2013.01)

(58) Field of Classification Search
CPC .................................. B60R 1/24; B60S 1/026
See application file for complete search history.

(56) References Cited

U.S. PATENT DOCUMENTS

| | | | | |
|---|---|---|---|---|
| 9,560,697 | B2 * | 1/2017 | Junghans | ................. H05B 3/34 |
| 2008/0111394 | A1 * | 5/2008 | Lewis | ................. B60R 13/0815 |
| | | | | 296/187.02 |
| 2014/0319203 | A1 * | 10/2014 | Smith | .................... B65D 71/46 |
| | | | | 229/120.02 |
| 2020/0094378 | A1 * | 3/2020 | Sigler | ................. B24D 15/023 |
| 2021/0306537 | A1 * | 9/2021 | Solar | ...................... H04N 23/57 |
| 2023/0345092 | A1 * | 10/2023 | Nagashima | ............. B60R 11/00 |

\* cited by examiner

*Primary Examiner* — Kyle M Lotfi
(74) *Attorney, Agent, or Firm* — Quarles & Brady LLP

(57)          ABSTRACT

A bracket assembly includes a camera bracket having a glare shield surface and a sidewall surface. The bracket assembly further includes a flexible substrate having a glare shield substrate configured to be attached on the glare shield surface, a sidewall substrate configured to be attached on the sidewall surface, and a channel between the glare shield substrate and the sidewall substrate. The flexible substrate is folded with an angle between the glare shield substrate and the sidewall substrate.

17 Claims, 8 Drawing Sheets

BRACKET ASSEMBLY WITH BENDABLE SUBSTRATE

CROSS-REFERENCE TO RELATED APPLICATIONS

This application claims priority to and the benefit of U.S. provisional patent application No. 63/430,094 filed in the United States Patent and Trademark Office on Dec. 5, 2022, the entire contents of which are incorporated herein by reference as if fully set forth below in their entireties and for all applicable purposes.

BACKGROUND

A vehicle camera bracket assembly can include a camera and a bracket for mounting the camera, among other electrical devices, on a windshield of a vehicle for the camera to capture object(s) or scene(s) beyond the windshield. The assembly includes a flexible substrate to attach a heater or other electrical components on the flexible substrate. However, due to the shape memory characteristic of the flexible substrate, the flexible substrate returns to its original flat shape. Thus, the camera cannot properly acquire the field of view between the flexible substrate and the windshield. What is needed are flexible substrates and methods that address one or more of these shortcomings.

SUMMARY

The following presents a simplified summary of one or more aspects of the present disclosure, to provide a basic understanding of such aspects. While some examples may be discussed as including certain aspects or features, all discussed examples may include any of the discussed features. Unless expressly described, no one aspect or feature is essential to achieve technical effects or solutions discussed herein.

In one aspect, a bracket assembly includes a camera bracket comprising a glare shield surface and a sidewall surface. The bracket assembly further includes a flexible substrate comprising a glare shield substrate configured to be attached on the glare shield surface, a sidewall substrate configured to be attached on the sidewall surface, and a channel between the glare shield substrate and the sidewall substrate. The flexible substrate is folded with an angle between the glare shield substrate and the sidewall substrate.

These and other aspects of the camera bracket assemblies and/or electrical circuit components discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various tools, devices, systems, and methods.

DETAILED DESCRIPTION OF THE DRAWINGS

Figures 1A, 1B:
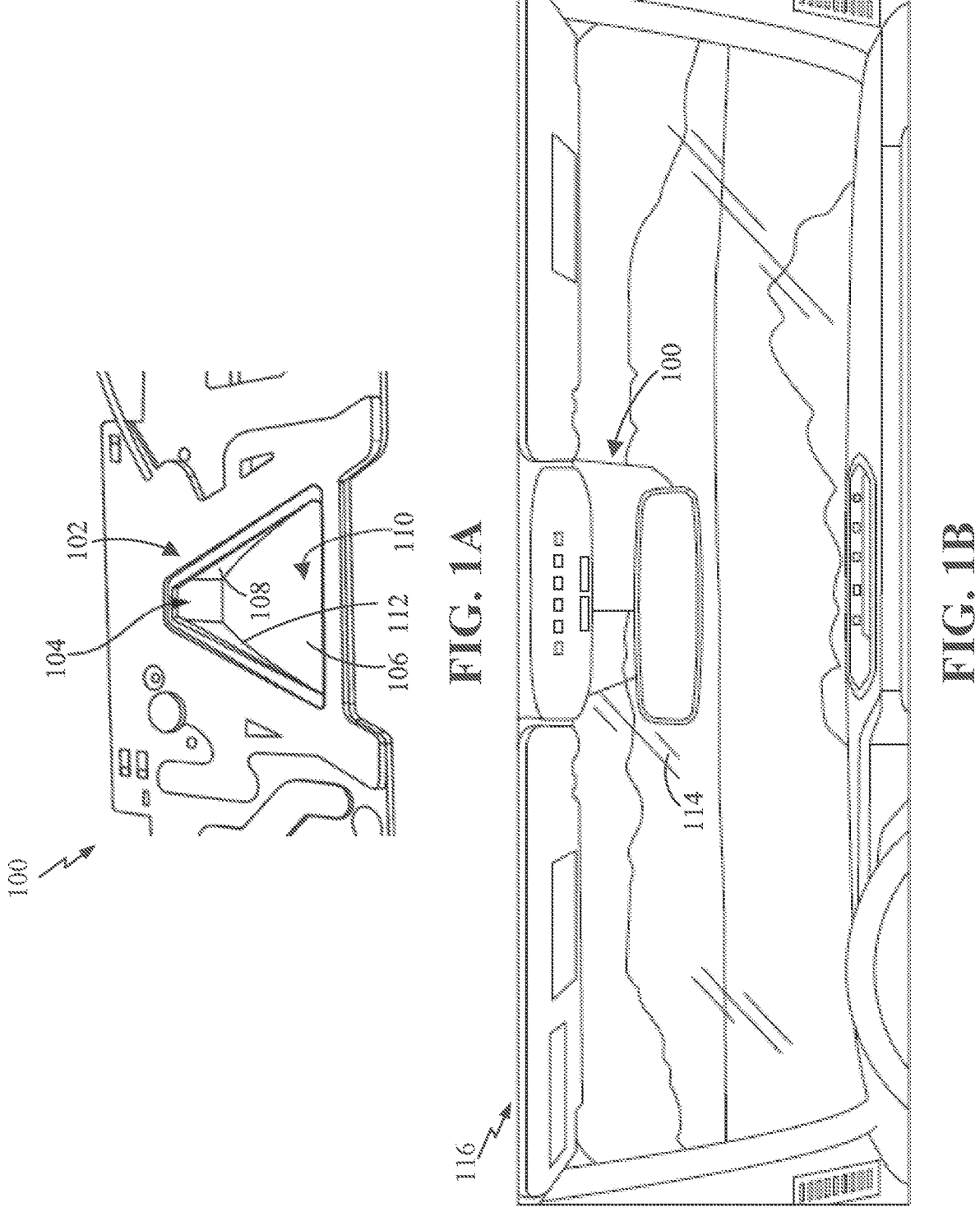
FIG. 1A is a schematic representation of a bracket assembly according to some embodiments.
FIG. 1B is a schematic representation of the bracket assembly of FIG. 1A being attached to a windshield of a vehicle.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

FIG. 1A depicts a bracket assembly 100 including a camera bracket 102, a hole 104 to mount a camera on the bracket assembly 100, a flexible substrate (not shown in FIG. 1A) on the camera bracket 102, and an electrical component (not shown in FIG. 1A) on the flexible substrate. In some examples, the camera bracket 102 includes a glare shield 106 and a sidewall 108 to define the field of view 110 of the camera (not shown in FIG. 1A). In some examples, the glare shield 106 is connected to the sidewall 108 with an edge 112. In further examples, the glare shield 106 is connected to the sidewall 108 with a suitable angle (e.g., 90°, 100°, 120°, 150°, or any suitable angle) to create the field of view of the camera between the glass and the camera bracket 102. In further examples, the glare shield 106 can have a substantial triangular shape, a trapezoidal shape, or any other suitable shape to provide a sufficient field of view of the camera mounted on the camera bracket 102. In further examples, the glare shield 106 can be flat or curved. In further examples, the sidewall 108 can include more than one side wall 108. For example, two sidewalls 108 can be connected to the glare shield 106 and the hole 104. In further examples, additional side walls can include one or more holes 104 and be connected to other side walls 108 and the glare shield 106. In some examples, the sidewall 108 can have a substantial triangular shape, a trapezoidal shape, or any other suitable shape. In further examples, the sidewall 108 can be flat or curved.

In some examples, the electrical component can include a heater (not shown in FIG. 1A) to effectively defrost the glass surrounding the field of view 108 of the camera. However, it should be appreciated that the electrical component is not limited to the heater. The electrical component can be any other suitable electrical component (e.g., a cooler, a light source, etc.). The electrical component is connected to the flexible substrate, which is attached to the camera bracket 102.

In some examples, the flexible substrate is connected to the electrical component and can be attached to the camera bracket 102. In some examples, the flexible substrate is made of a heat-resistant material (e.g., a polyimide, a polyethylene terephthalate (PET), a laminate, etc.). In further examples, the flexible substrate can be attached on both of the glare shield 106 and the sidewall 108. Further, the flexible substrate materials may have a shape memory characteristic. Thus, when the shape of the flexible substrate is manually altered to bend, the flexible substrate tends to return to its original shape (e.g., flat shape). In some scenarios, the memory characteristic of the flexible substrate can prevent the flexible substrate from being fully attached to the glare shield 108 and the sidewall 110 because the glare shield 106 and the side wall are connected at an edge or a curve. Thus, the flexible substrate tends to deviate from the designed profile and return to its native profile, which is often flat. To aid the flexible substrate in maintaining the custom profile and preventing separation from the other components (e.g., the glare shield 106 or sidewall 108), two example methods (i.e., a scoring method in connection with FIGS. 2-5 and a perforating method in connection with FIGS. 6-8) to generate a channel are described in the present disclosure.

With reference FIG. 1B, the bracket assembly 100 is attached to the glass 114 (i.e., windshield) of a vehicle 116. The bracket assembly 100 is arranged on the glass 114 such that the field of view 110 of the camera (shown in FIG. 1A) faces toward the glass 110 and forwardly into the vehicle's forward direction of travel. As such, the bracket assembly 100 can operate as part of, for example, a lane departure warning (LDW) system and/or an automatic emergency braking system, among other functionalities. It should be appreciated that the use case illustrated in FIG. 1B is only one example. The bracket assembly 100 can be used in any other suitable place. For example, the bracket assembly 100 can be used in a variety of applications such as aircrafts or security systems, among other uses.

Figure 2:
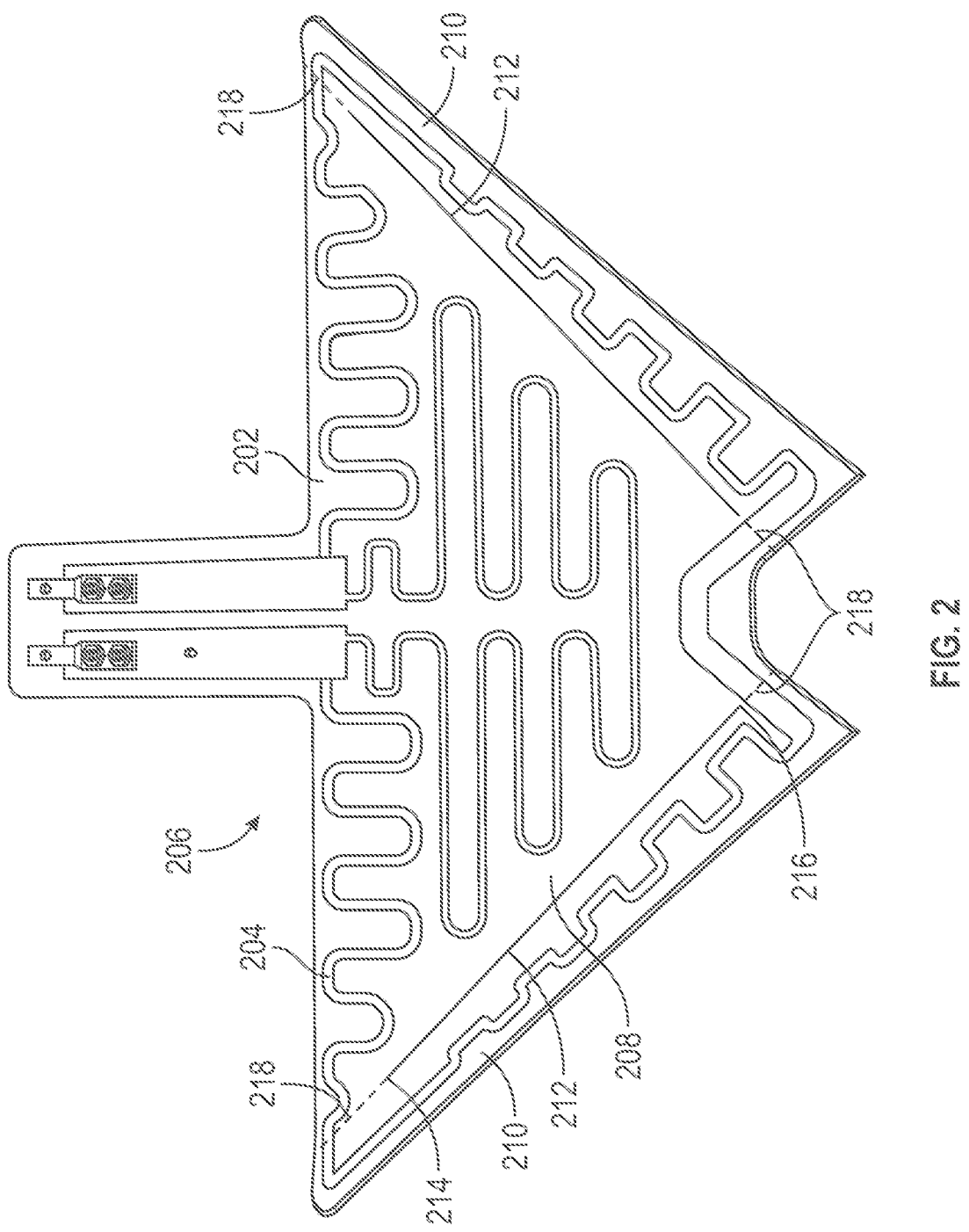
FIG. 2 is a first surface of an example flexible substrate using a scoring process.
Figure 3:
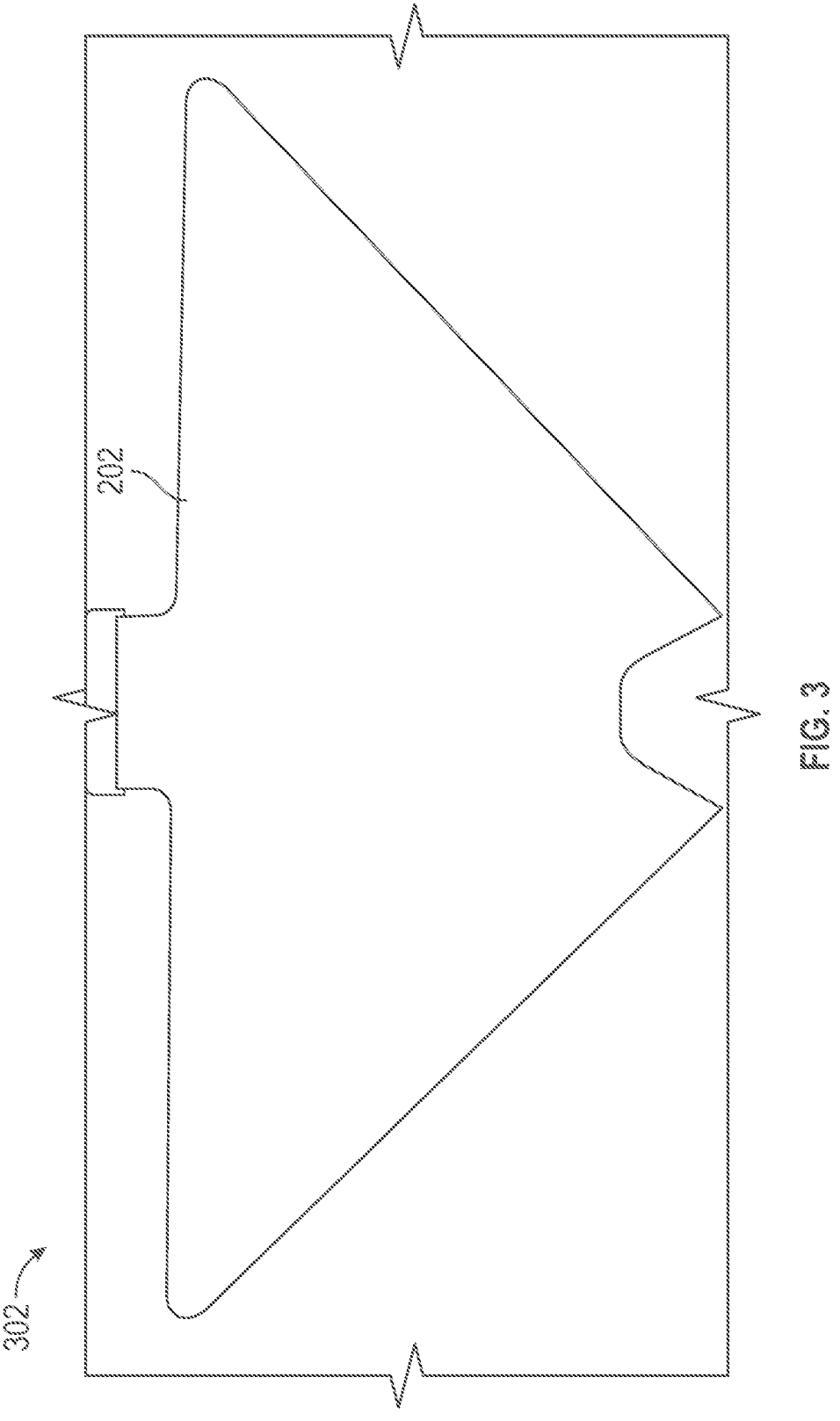
FIG. 3 is a second surface of the example flexible substrate of FIG. 2.

FIG. 2 shows a flexible substrate 202 and an electrical component 204 (e.g., a heater) connected to the flexible substrate 202. The flexible substrate 202 can have a shape corresponding to the camera bracket 102 (shown in FIG. 1A) and is configured to be attached to the camera bracket 102. However, it should be appreciated the shape of the flexible substrate 202 can be any other suitable shape, e.g., a shape corresponding to the glare shield 106 (shown in FIG. 1A), a shape corresponding to the sidewall 108 (shown in FIG. 1A), or any other suitable shape for the electronic component 204. In some examples, a first surface 206 of the flexible substrate 202 is connected to the electrical component 204 and is configured to be attached to a surface of the camera bracket 102 (shown in FIG. 1A) exposed to the field of view of the camera.

In some examples, the flexible substrate 202 includes a glare shield substrate 208 and a sidewall substrate 210. The glare shield substrate 208 is configured to be attached to the glare shield 106 (shown in FIG. 1A) of the camera bracket 102 (shown in FIG. 1A) while the sidewall 210 is configured to be attached to the sidewall 106 (shown in FIG. 1A) of the camera bracket 102 (shown in FIG. 1A). Thus, the glare shield substrate 208 is connected to the sidewall substrate 210 with the same or similar angle to the angle between the glare shield 106 (shown in FIG. 1A) and the sidewall 106 (shown in FIG. 1A). The flexible substrate 202 further includes a score 212 (i.e., a type of channel) between the glare shield substrate 208 and the sidewall substrate 210. When the flexible substrate 202 is attached to the glare shield 106 (shown in FIG. 1A) and the sidewall 108 (shown in FIG. 1A), the score 212 is configured to be adjacent to the edge 112 (shown in FIG. 1A) between the glare shield 106 and the sidewall 108. In some examples, the score 212 can extend from a beginning point 214 to an end point 216 along the edge 112 (shown in FIG. 1A) or an abutting line 218 between the glare shield substrate 208 and the sidewall substrate 210. The abutting line 218 is a line at which the glare shield substrate 208 meets the sidewall substrate 210. The beginning point 214 and the end point 216 can be in the middle of the abutting line 218 between the glare shield substrate 208 and the sidewall substrate 210. The score 212 can be formed at a part of the abutting line 218 between the glare shield substrate 208 and the sidewall substrate 210. In other examples, the beginning point 214 can be placed at one end of the abutting line 218 between the glare shield substrate 208 and the sidewall substrate 210, and the end point 216 can be placed at the other end of the abutting line 218. In some examples, the score 212 is formed on the first surface 206 of the flexible substrate 202. Because the score 212 is on the first surface 206, the glare shield substrate 208 and the sidewall substrate 210 are folded in the direction of a second surface 302 of the flexible substrate 202 (shown in FIG. 3), which is an opposite surface to the first surface. However, it should be appreciated that the glare shield substrate 208 and the sidewall substrate 210 can be folded toward the first surface 206 of the flexible substrate 202.

Figure 4:
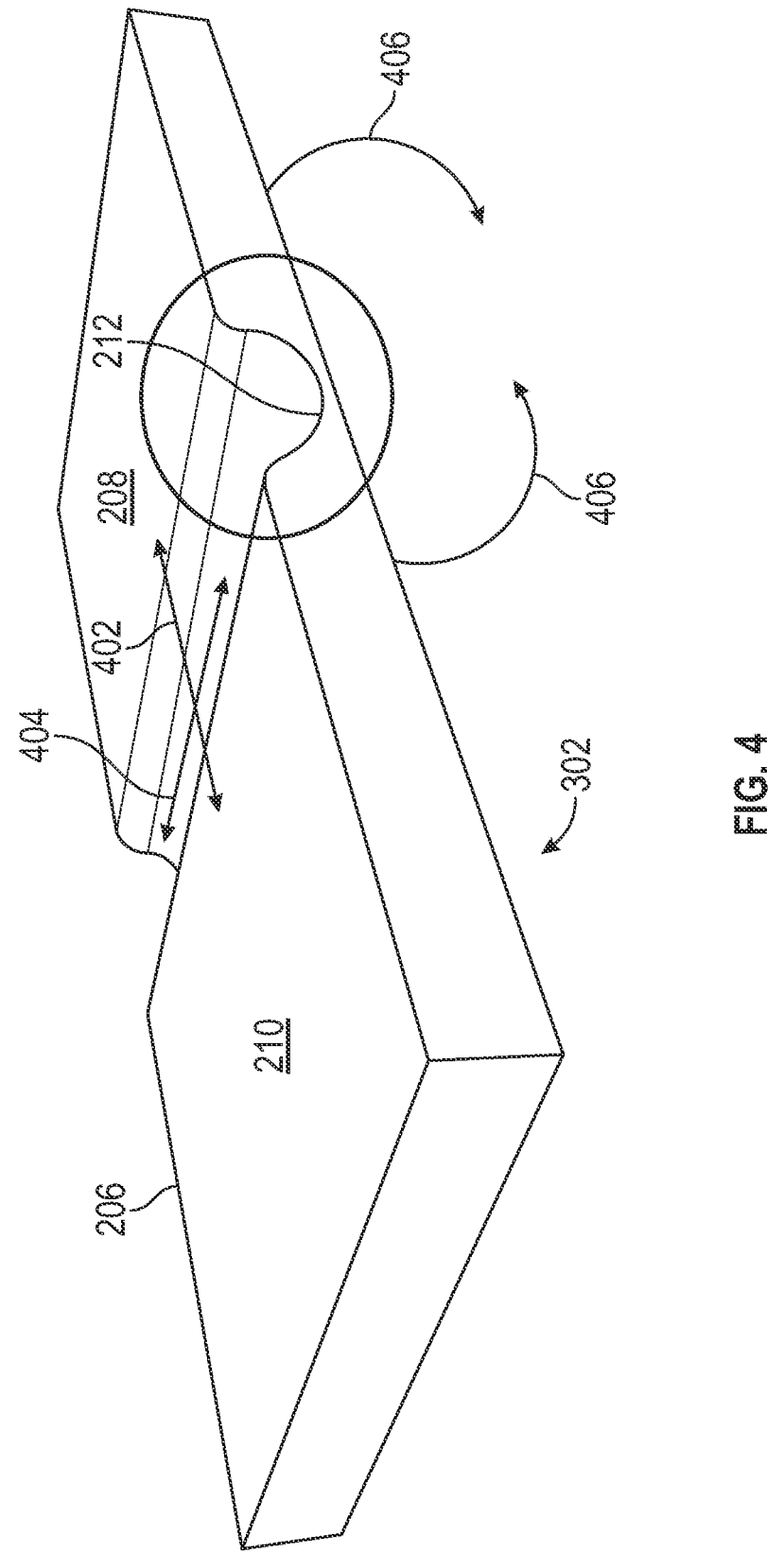
FIG. 4 is a schematic representation of an example flexible substrate using a creasing technique.

With reference to FIG. 4, the score 212 is formed between the glare shield substrate 208 and the sidewall substrate 210 of the flexible substrate 102. The score 212 is placed on the first surface 206 of the flexible substrate 102. The score 212 can be an elongated groove or a trench cut into the flexible substrate. The score 212 can have a substantial "U" shape, a substantial "V" shape, a rectangular shape, or any other suitable shape in a first direction 402 at a right angle to a second direction 404 to which the score 212 is extended along the abutting line 218 (shown in FIG. 2) between the glare shield substrate 208 and the sidewall substrate 210. In some examples, the glare shield substrate 208 and the sidewall substrate 210 are configured to be folded in the direction 406 of the second surface 302 of the flexible substrate 102. The second surface 302 is a surface opposite to the first surface 206 where the score 212 is disposed.

Figure 5A:
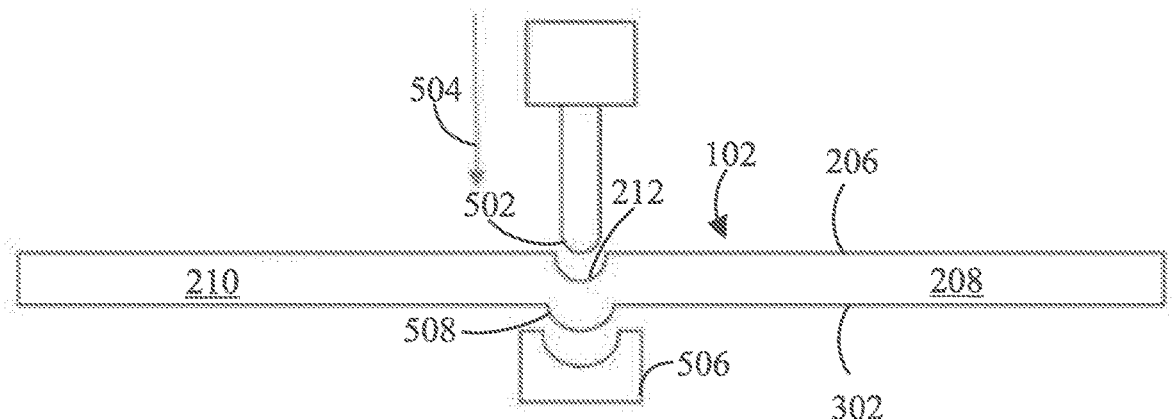
FIGS. 5A and 5B illustrate an example scoring process of a flexible substrate.
Figure 5B:
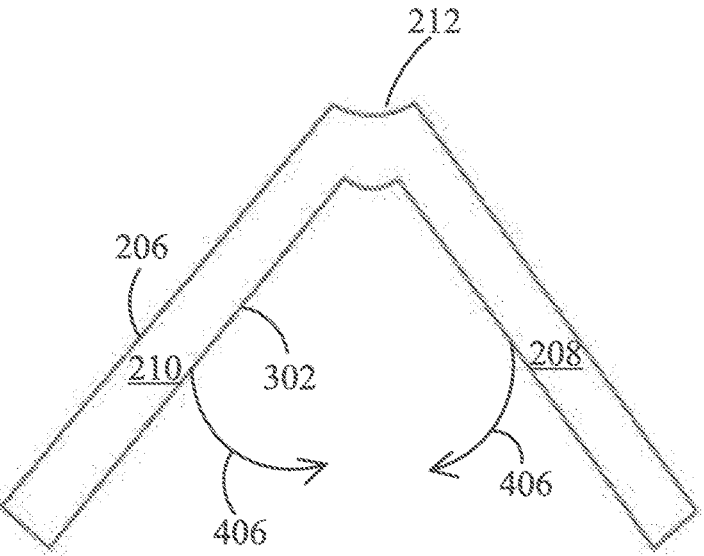

FIGS. 5A and 5B illustrate a scoring process to generate the score 212 on the flexible substrate 102. For example, the scoring process is an operation where an edge 502 (non-cutting edge) is applied to the first surface of the flexible substrate 102 with a certain force in a direction 504. The flexible substrate 102 is then compressed to generate the score 212 on the flexible substrate 102. Then, the score 212 bends the glare shield substrate 208 and the sidewall substrate 210 such that the flexible substrate 102 has a tendency to be bent in the direction 406 of the second surface 302 as shown in FIG. 5B. Thus, the flexible substrate 102 can maintain the folded angle between the glare shield substrate 208 and the sidewall substrate 210 rather than return to its original shape, which is flat. In further examples, a female score rule 506 can be placed on the second surface 302 of the substrate 102 such that the edge 502 can be received in the female score rule 506. In some examples, the second surface 302 of the flexible substrate 102 can have a protrusion 508 due to the female score rule 506. In the other examples, the sharp edge 502 (non-cutting edge) is applied toward a flat surface without generating the protrusion 508 on the second surface of the flexible substrate 102.

Figure 6A:
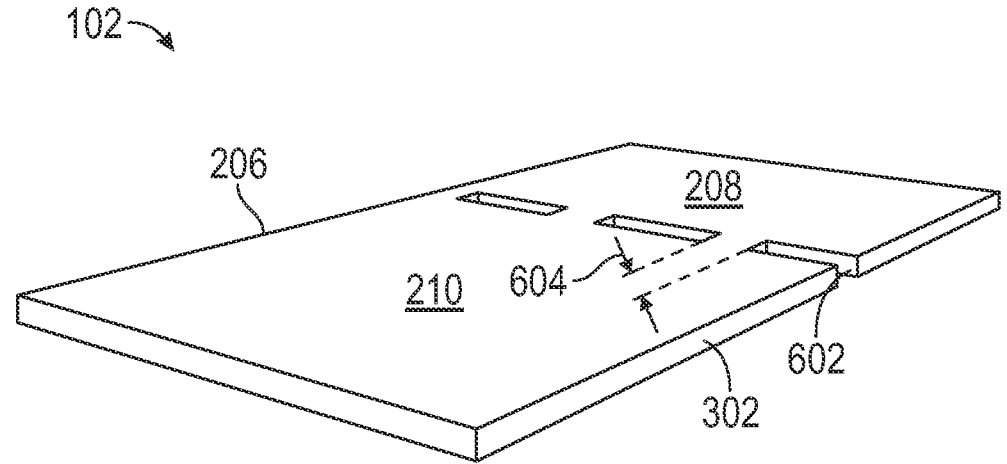
FIGS. 6A and 6B are schematic representations of example flexible substrates using a perforating process.
Figure 6B:
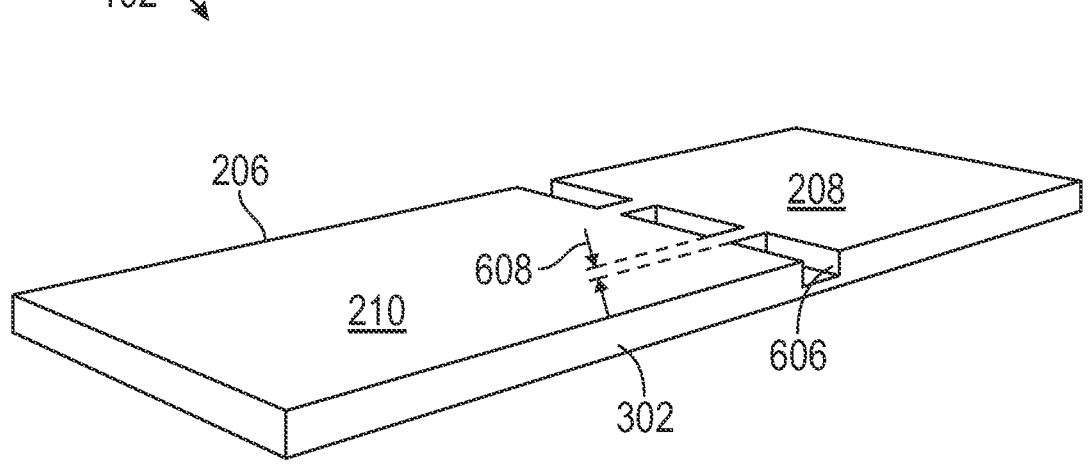

FIGS. 6A and 6B illustrate the flexible substrate 602 with punctures 602 or grooves 606 (i.e., different types of channel) using a perforating process to maintain the custom profile. For example, the perforating process perforates the flexible substrate 102 along the abutting line 218 (shown in FIGS. 2 and 7) between the glare shield substrate 208 and the sidewall substrate 210 of the flexible substrate 102. Unlike the score 212 extending along the edge or the abutting line between the glare shield substrate 208 and the sidewall substrate 210 in FIG. 4, the perforating process can generate multiple punctures 602 or grooves 606 along the line between the glare shield substrate 208 and the sidewall substrate 210.

In the example of FIG. 6A, the flexible substrate 102 can be punctured from the first surface 206 of the flexible substrate 102 to the second surface 302 of the flexible substrate 102. Thus, a puncture 602 in FIG. 6A is a hole passing through the flexible substrate 102. In some embodiments, multiple punctures 602 can be provided within the flexible substrate 102, and each puncture 602 can have the same shape. Each distance 604 between two neighboring punctures 602 can have the same distance. The distance 604 between two neighboring punctures 602 can be any suitable distance to reduce the tendency of the flexible substrate 102 to return to the flat surface. It should be appreciated that multiple punctures 602 can have different shapes, and the distances 604 between two neighboring punctures can be different.

In the example of FIG. 6B, the flexible substrate 102 can be partially punctured on the first surface 206 of the flexible substrate 102 to generate multiple grooves 606. In some examples, multiple grooves 606 can be disposed on the first surface 206 of the flexible substrate 102, and each groove 606 can have the same shape. In some examples, the groove can have a substantial 'U' shape, a substantial 'V' shape, a rectangular shape, or any other suitable shape. Each distance 608 between two neighboring grooves 606 can have the same distance. The distance 608 between two neighboring grooves 606 can be any suitable distance to reduce the tendency of the flexible substrate 102 to return to the flat surface. It should be appreciated that multiple grooves 606 can have different shapes, and the distances 608 between two neighboring punctures can be different.

Figure 7:
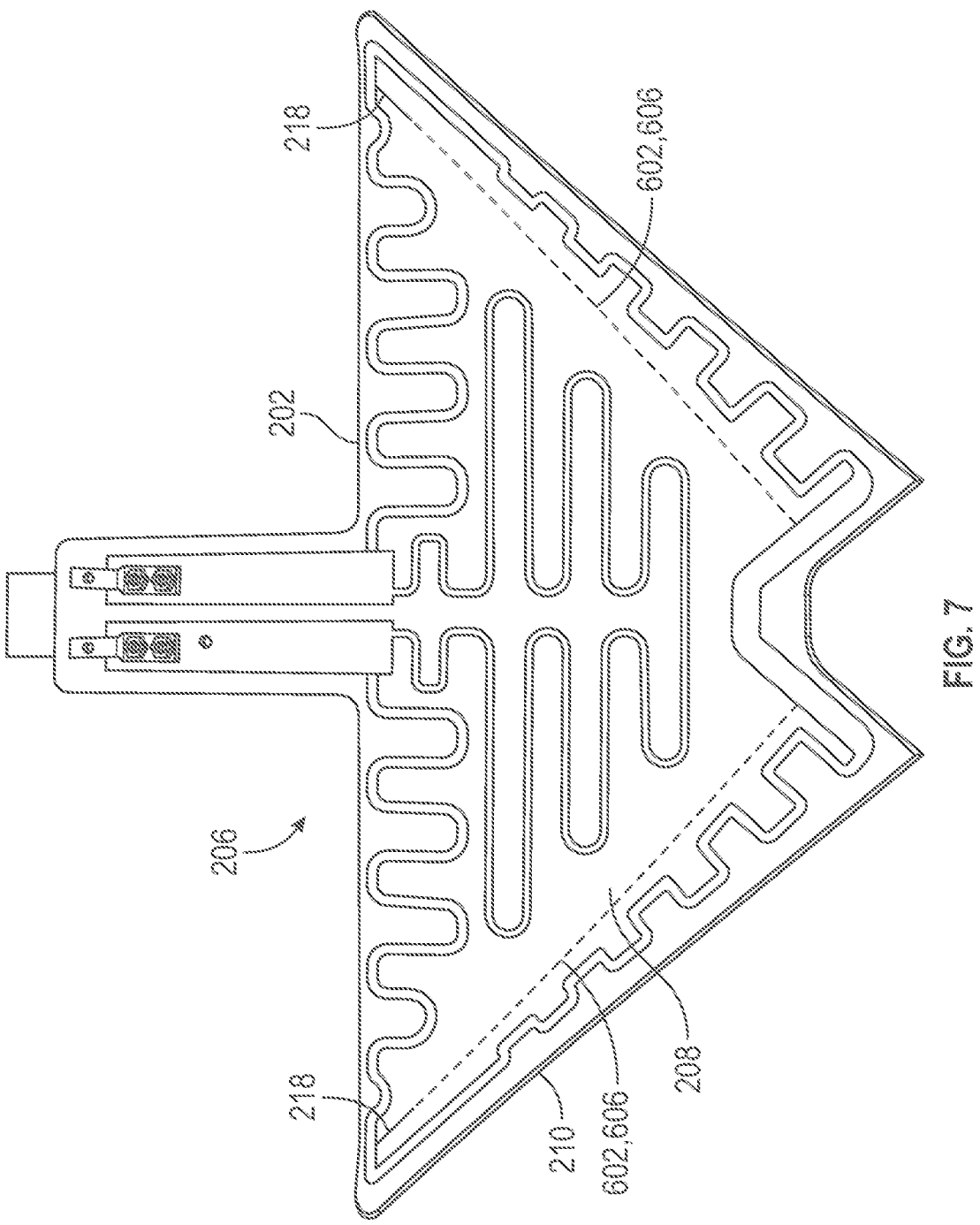
FIG. 7 is a first surface of an example flexible substrate using a perforating process.
Figure 8:
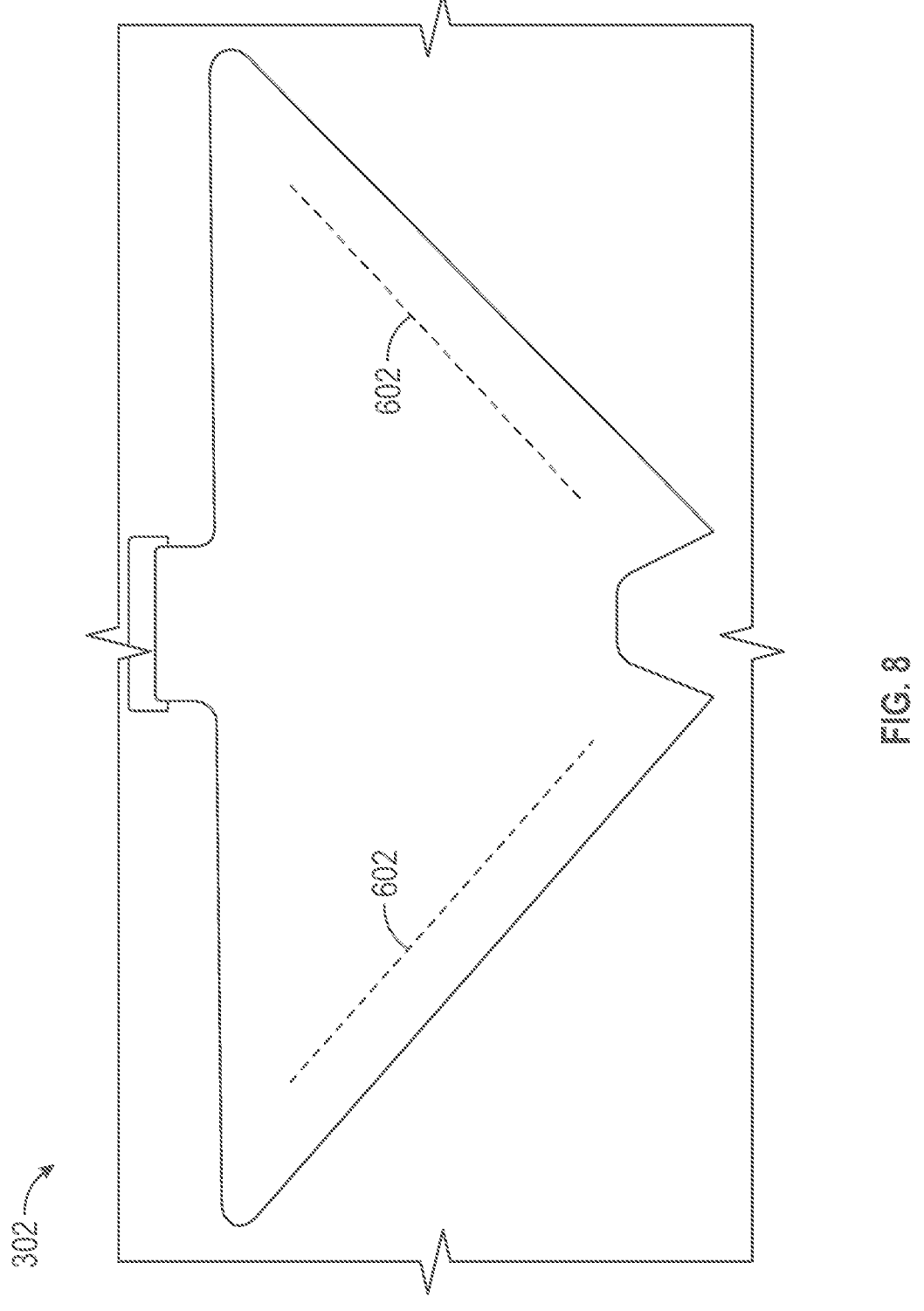
FIG. 8 is a second surface of the example flexible substrate of FIG. 7.

With reference to FIG. 7, a flexible substrate 202 can include multiple punctures 602 or grooves 606 on the flexible substrate 202 to be attached on the camera bracket 102 (shown in FIG. 1A). The multiple punctures 602 or grooves 606 are formed on the edge or the abutting line between the glare shield substrate 208 and the sidewall substrate 210 of the flexible substrate 202. In some examples, the punctures 602 are shown on the first surface 206 and the second surface 302 (shown in FIG. 8), and the grooves 606 of the flexible substrate 202 are shown on the first surface 206. In further examples, the glare shield substrate 208 and the sidewall substrate 210 are configured to be folded along the punctures 602 or the grooves 606 toward the second surface 302 of the flexible substrate 202 (shown in FIG. 8), which is an opposite surface to the first surface 206. However, it should be appreciated that the glare shield substrate 208 and the sidewall substrate 210 can be folded toward the first surface 206 of the flexible substrate 202.

Further Examples

Example 1: A bracket assembly, comprising: a camera bracket having a glare shield surface and a sidewall surface: and a flexible substrate having a glare shield substrate attached to the glare shield surface, a sidewall substrate attached to the sidewall surface, and a channel between the glare shield substrate and the sidewall substrate, wherein the flexible substrate is bent between the glare shield substrate and the sidewall substrate.

Example 2: The bracket assembly of Example 1, wherein the channel is at least one of: a score, a plurality of punctures, or a plurality of grooves.

Example 3: The bracket assembly of Example 1 or 2, wherein the channel is the score, and wherein the score is substantially U-shaped in a first direction at a right angle to an abutted line between the glare shield substrate and the sidewall substrate.

Example 4: The bracket assembly of any of Examples 1 to 3, wherein the channel is the plurality of grooves, and wherein a first groove of the plurality of grooves is substantially V-shaped in a first direction at a right angle to an abutted line between the glare shield substrate and the sidewall substrate.

Example 5: The bracket assembly of any of Examples 1 to 4, wherein the channel is at least one of the score or the plurality of grooves, wherein a cut in the channel is on a first surface of the flexible substrate, and wherein the first surface of the flexible substrate is attached to the glare shield surface and the sidewall surface.

Example 6: The bracket assembly of any of Examples 1 to 5, wherein a second surface of the flexible substrate has a protrusion between the glare shield substrate and the sidewall substrate, and wherein the second surface is an opposite surface of the flexible substrate to the first surface.

Example 7: The bracket assembly of any of Examples 1 to 6, further comprising: a heater attached to the flexible substrate.

Example 8: A bracket assembly, comprising: a camera bracket having a glare shield surface and a sidewall surface: and a flexible substrate having a glare shield substrate attached to the glare shield surface, a sidewall substrate attached to the sidewall surface, and a score between the glare shield substrate and the sidewall substrate, wherein the flexible substrate is bent between the glare shield substrate and the sidewall substrate.

Example 9: The bracket assembly of Example 8, wherein the score is substantially U-shaped in a first direction at a right angle to an abutted line between the glare shield substrate and the sidewall substrate.

Example 10: The bracket assembly of Example 8 or 9, wherein a cut in the score is on a first surface of the flexible substrate, and wherein the first surface of the flexible substrate is attached to the glare shield surface and the sidewall surface.

Example 11: The bracket assembly of any of Examples 8 to 10, wherein a second surface of the flexible substrate has a protrusion between the glare shield substrate and the sidewall substrate, and wherein the second surface is an opposite surface of the flexible substrate to the first surface.

Example 12: The bracket assembly of any of Examples 8 to 11, further comprising: a heater attached to the flexible substrate.

Example 13: A bracket assembly, comprising: a camera bracket having a glare shield surface and a sidewall surface:

and a flexible substrate having a glare shield substrate attached to the glare shield surface, a sidewall substrate attached to the sidewall surface, and a plurality of grooves between the glare shield substrate and the sidewall substrate, wherein the flexible substrate is bent between the glare shield substrate and the sidewall substrate.

Example 14: The bracket assembly of Example 13, wherein a first groove of the plurality of grooves is substantially V-shaped in a first direction at a right angle to an abutted line between the glare shield substrate and the sidewall substrate.

Example 15: The bracket assembly of Example 13 or 14, wherein a cut in the first groove is on a first surface of the flexible substrate, and wherein the first surface of the flexible substrate is attached to the glare shield surface and the sidewall surface.

Example 16: The bracket assembly of any of Examples 13 to 15, wherein a second surface of the flexible substrate has a protrusion between the glare shield substrate and the sidewall substrate, and wherein the second surface is an opposite surface of the flexible substrate to the first surface.

Example 17: The bracket assembly of any of Examples 13 to 16, further comprising: a heater attached to the flexible substrate.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:

1. A bracket assembly, comprising:
a camera bracket having a glare shield surface and a sidewall surface; and
a flexible substrate having a glare shield substrate attached to the glare shield surface, a sidewall substrate attached to the sidewall surface, and a channel between the glare shield substrate and the sidewall substrate,
wherein the flexible substrate is bent between the glare shield substrate and the sidewall substrate.

2. The bracket assembly of claim 1, wherein the channel is at least one of: a score, a plurality of punctures, or a plurality of grooves.

3. The bracket assembly of claim 2, wherein the channel is the score, and
wherein the score is substantially U-shaped in a first direction at a right angle to an abutted line between the glare shield substrate and the sidewall substrate.

4. The bracket assembly of claim 2, wherein the channel is the plurality of grooves, and
wherein a first groove of the plurality of grooves is substantially V-shaped in a first direction at a right angle to an abutted line between the glare shield substrate and the sidewall substrate.

5. The bracket assembly of claim 2, wherein the channel is at least one of the score or the plurality of grooves,
wherein a cut in the channel is on a first surface of the flexible substrate, and
wherein the first surface of the flexible substrate is attached to the glare shield surface and the sidewall surface.

6. The bracket assembly of claim 5, wherein a second surface of the flexible substrate has a protrusion between the glare shield substrate and the sidewall substrate, and
wherein the second surface is an opposite surface of the flexible substrate to the first surface.

7. The bracket assembly of claim 2, further comprising: a heater attached to the flexible substrate.

8. A bracket assembly, comprising:
a camera bracket having a glare shield surface and a sidewall surface; and
a flexible substrate having a glare shield substrate attached to the glare shield surface, a sidewall substrate attached to the sidewall surface, and a score between the glare shield substrate and the sidewall substrate,
wherein the flexible substrate is bent between the glare shield substrate and the sidewall substrate.

9. The bracket assembly of claim 8, wherein the score is substantially U-shaped in a first direction at a right angle to an abutted line between the glare shield substrate and the sidewall substrate.

10. The bracket assembly of claim 8, wherein a cut in the score is on a first surface of the flexible substrate, and
wherein the first surface of the flexible substrate is attached to the glare shield surface and the sidewall surface.

11. The bracket assembly of claim 10, wherein a second surface of the flexible substrate has a protrusion between the glare shield substrate and the sidewall substrate, and
wherein the second surface is an opposite surface of the flexible substrate to the first surface.

12. The bracket assembly of claim 8, further comprising: a heater attached to the flexible substrate.

13. A bracket assembly, comprising:
a camera bracket having a glare shield surface and a sidewall surface; and
a flexible substrate having a glare shield substrate attached to the glare shield surface, a sidewall substrate attached to the sidewall surface, and a plurality of grooves between the glare shield substrate and the sidewall substrate,
wherein the flexible substrate is bent between the glare shield substrate and the sidewall substrate.

14. The bracket assembly of claim 13, wherein a first groove of the plurality of grooves is substantially V-shaped in a first direction at a right angle to an abutted line between the glare shield substrate and the sidewall substrate.

15. The bracket assembly of claim 14, wherein a cut in the first groove is on a first surface of the flexible substrate, and
wherein the first surface of the flexible substrate is attached to the glare shield surface and the sidewall surface.

16. The bracket assembly of claim 15, wherein a second surface of the flexible substrate has a protrusion between the glare shield substrate and the sidewall substrate, and
wherein the second surface is an opposite surface of the flexible substrate to the first surface.

17. The bracket assembly of claim 13, further comprising: a heater attached to the flexible substrate.

* * * * *